(12) United States Patent
Dorrough et al.

(10) Patent No.: US 12,516,929 B2
(45) Date of Patent: Jan. 6, 2026

(54) DISPLAY METHODS, TECHNIQUES, AND SYSTEMS FOR ELECTRONIC LEVELS

(71) Applicant: Franklin Sensors, Inc., Meridian, ID (US)

(72) Inventors: David Dorrough, Eagle, ID (US); Owen Barnes, Meridian, ID (US); David Chin, Meridian, ID (US); Karen Garcia, Meridian, ID (US); Jacob Thomas, Nampa, ID (US); Daniel Toborg, Meridian, ID (US); Jay Paxman, Meridian, ID (US); Natalie Boehm, Meridian, ID (US)

(73) Assignee: Franklin Sensors Inc., Meridian, ID (US)

( * ) Notice: Subject to any disclaimer, the term of this patent is extended or adjusted under 35 U.S.C. 154(b) by 367 days.

(21) Appl. No.: 18/220,133

(22) Filed: Jul. 10, 2023

(65) Prior Publication Data

US 2024/0288269 A1  Aug. 29, 2024

Related U.S. Application Data

(60) Provisional application No. 63/486,628, filed on Feb. 23, 2023.

(51) Int. Cl.
*G01C 9/06* (2006.01)

(52) U.S. Cl.
CPC ......... *G01C 9/06* (2013.01); *G01C 2009/066* (2013.01)

(58) Field of Classification Search
CPC ....................................................... G01C 9/06

(Continued)

(56) References Cited

U.S. PATENT DOCUMENTS

| | | | | |
|---|---|---|---|---|
| 1,375,278 A | * | 4/1921 | Clayton | B64D 45/00 33/366.27 |
| 3,354,554 A | * | 11/1967 | Panerai | H05B 33/12 33/377 |

(Continued)

FOREIGN PATENT DOCUMENTS

| | | |
|---|---|---|
| JP | H08-501152 | 2/1996 |
| KR | 10-2005-0009655 A | 1/2005 |
| KR | 20170071249 A | 6/2017 |

OTHER PUBLICATIONS

International Search Report and Written Opinion dated Jun. 24, 2024 for PCT/US2024/016889.

(Continued)

*Primary Examiner* — George B Bennett
(74) *Attorney, Agent, or Firm* — Foley & Lardner LLP

(57) ABSTRACT

Systems and methods for electronic levels are disclosed. An electronic level can include one or more sensing elements configured to detect levelness of the electronic level. The electronic level can include a display including multiple output display elements arranged in an array that extends in a direction along a longitudinal axis of the electronic level and configured to display an indication of the levelness of the electronic level. The electronic level can include a controller coupled with the one or more sensing elements and the multiple output display elements. The controller may be configured to activate the one or more sensing elements to detect the levelness and activate one or more of the multiple output display elements to display the indication based on the levelness.

20 Claims, 10 Drawing Sheets

(58) Field of Classification Search
USPC .......................................... 33/366.11–366.27
See application file for complete search history.

(56) References Cited

U.S. PATENT DOCUMENTS

| | | | | |
|---|---|---|---|---|
| 4,503,622 | A * | 3/1985 | Swartz | G01C 9/06 33/366.14 |
| 4,603,484 | A * | 8/1986 | Strothmann | G01C 9/06 33/366.22 |
| 4,693,598 | A * | 9/1987 | Sehr | G01S 3/78 356/400 |
| 4,942,668 | A * | 7/1990 | Franklin | G01B 11/26 33/366.23 |
| 5,031,329 | A * | 7/1991 | Smallidge | G01C 9/06 33/366.12 |
| 5,136,784 | A | 8/1992 | Marantz | |
| 5,313,713 | A * | 5/1994 | Heger | G01C 9/06 33/343 |
| 5,479,715 | A * | 1/1996 | Schultheis | G01C 9/32 33/366.27 |
| 5,488,779 | A * | 2/1996 | Schultheis | G01C 9/32 33/366.27 |
| 5,956,260 | A * | 9/1999 | Heger | G01C 9/06 345/23 |
| 6,128,076 | A | 10/2000 | Sackett | |
| 6,696,827 | B2 | 2/2004 | Fazekas et al. | |
| 7,188,426 | B2 | 3/2007 | Barr | |
| 8,661,701 | B2 * | 3/2014 | Wixey | G01C 9/06 33/534 |
| 9,030,194 | B2 * | 5/2015 | Dolsak | G01D 5/24438 33/708 |
| 10,088,311 | B2 * | 10/2018 | Eskew | G01C 9/18 |
| 11,353,325 | B2 * | 6/2022 | Mueckl | G01C 9/06 |
| 11,668,563 | B2 * | 6/2023 | Sakakibara | G01C 9/04 33/366.27 |
| 11,852,503 | B1 | 12/2023 | Varner | |
| 12,104,924 | B1 * | 10/2024 | Henchon | G01C 9/06 |
| 2007/0180719 | A1 * | 8/2007 | Donnelly | B60S 9/02 33/366.11 |
| 2020/0256817 | A1 * | 8/2020 | Dorrough | G01R 27/2605 |
| 2021/0404806 | A1 * | 12/2021 | Loebig | G01C 9/08 |
| 2024/0230740 | A1 * | 7/2024 | Dorrough | G01R 29/0892 |

OTHER PUBLICATIONS

"2023 Product Guide, A New Level of Accuracy", iMEX Lasers, 2023.
"Digital Level Code ISE-2DT", https://m.insize.com/page-25-1203.html, accessed Mar. 5, 2024.
"Displaying the Electronic Level (EOS 6D)", https://support.canon.com, accessed Mar. 5, 2024.
"El Series Digital Level—Operation Manual", Imex 1800 669 110, 2016.
"Fowler Mini-Mag Protractor", Fred V. Fowler Company, Inc., Dec. 2009.
"Magnetic Digital Level Model No. 40-6060", Johnson Level & Tool —Rev. 2, 5670H-English_Manuals, May 2, 2012.
"Operating Instructions: STABILA 196-2 Electronic-IP65" https://www.manualslib.com/manual/2050099/Stabila-Tech-196-2-Electronic-Series.html?page=2#manual, Accessed Mar. 5, 2024.
"R&D PT181 3 in 1 Digital Laser Inclinometer Protractor Angle Measure with Type-C", https://www.ebay.com/itm/385604046825?itmmeta=01HSBVW18VPKV6E23T4522HDP1&hash=item59c7cacfe9:g:DOEAAOSwbSJkW2B~&itmprp=enc%3AAAQAJAAAA4HI%2FiF3dmlwSZf9KgHmh%2FTKTEUeWgMSPRiVtR3FzelCjHXj%2BPTORP%2F51Y03ok8c4iAURT4ilkMmiK2WcoyCJsqn55KQ4a1TxvCKUiWZrrrps2ibCu337HQLnsJZwAstExOHfFLrfdxhaB4WPp0u9xNcl5clOHOHgKHjG11kbaK7de2xZ1wesiZ1JmlAAFuxRTdTL9Tlxa4MqjqxqCqvCjr4CD4JduhkOYEYSLxey3h%2BiLfuN9U7mt%2FyTZE2WEWdduE6hhFykr7DsThV.
"R&D PT181 3 in 1 Digital Laser Inclinometer Protractor Angle Measure with Type-C", www.ebay.com, accessed Mar. 5, 2024.
"Redstick Digital Level with PinPoint Measurement Technology", Operator's Manual, Milwaukee Tool, Dec. 2018.
"VideoLevel/VideoLevel Pro", Zircon A Higher Form of Tools, chrome-extension://efaidnbmnnnibpcajpcglclefindmkaj/https://www.zircon.com/wp-content/uploads/2019/06/VideoLevel-and-Pro-Instructions.pdf, accessed Mar. 5, 2024.
Bubble Level for iphone, Apple App Store, accessed Mar. 5, 2024.
Digi-Pas, "Pocket Size Digital Level User Manual", www.digipas.com, accessed Mar. 5, 2024.
Digital Angle Gauge & Level—Instructions, www.kleintools.com, Klein Tools 935DAG, accessed Mar. 5, 2024.
Easy-Laser, "User Manual XT", Dec. 5, 2023, Revision 9.0.0, pp. 218-230.
Levelmaster LM5, Electronic Slope Meter Brochure, Latec Instruments, Inc., https://latecmc.com/products/lm5/, accessed Mar. 5, 2024.
Precision Electronic Level, Level Master LVM-01 Operation Manual, No. 1218 Big Daishowa Seiko Co., Ltd., chrome-extension://efaidnbmnnnibpcajpcglclefindmkaj/https://www.bigdaishowa.com/sites/default/files/documents/2018-02/manual-big_daishowa-level_master.pdf, accessed Mar. 5, 2024.

* cited by examiner

DISPLAY METHODS, TECHNIQUES, AND SYSTEMS FOR ELECTRONIC LEVELS

RELATED APPLICATIONS

This application claims the benefit of priority under 35 U.S.C. § 119 (e) to U.S. Provisional Patent Application No. 63/486,628 titled "DISPLAY FOR AN ELECTRONIC LEVEL," filed Feb. 23, 2023, which is hereby incorporated herein by reference.

BACKGROUND

Detecting levelness (e.g., a measure of being level; an angle of inclination in reference to a reference surface) of an object, plane, surface, or between objects is a common problem encountered during construction, repair, renovation, and similar activities. For example, while installing a door frame, detecting that the door frame is horizontally and vertically level will support installing a more structurally sound door frame. If the door frame is installed without being level, the integrity and functionality of the door frame may be impeded. This and other deficiencies make detecting levelness desirable while performing similar activities.

A variety of techniques have been employed with limited success to address the problem of detecting and displaying levelness of a surface (e.g., a surface of an object). The techniques may include placing a bubble level or a digital level on a surface of the object. The bubble level includes a chamber that is partially filled with a liquid solution such that the unfilled portion constitutes a bubble. The bubble level displays a levelness of the object by how close the bubble is to the center of the chamber. Because of the size of the bubble displaying levelness, a small amount of movement of the bubble can represent a significant change in levelness. For example, a movement of the bubble by a tenth of a millimeter can correspond to a change in levelness beyond some construction tolerances. A user may find difficulty in trying to detect a tenth of a millimeter movement of the bubble and thereby accurately discerning the levelness of the object. This may increase time, skill, and training for the user to use the bubble level accurately. Additionally, the bubble level may be difficult to see in some environments (e.g., low light, visually obscuring environments), which may result in inaccuracies of discerning levelness by the user.

A digital level may also include various difficulties in detecting levelness. A digital level may use electronic sensors, such as accelerometers, to sense if the surface is level. A digital level may display a digital value (e.g., a number, a quantity) to represent a current angle of inclination of the digital level. While the digital display may improve upon visibility when compared to bubble levels, the nature of displaying the angle of the digital level may be non-intuitive in determining a magnitude and direction for correcting (e.g., moving) the digital level to efficiently (e.g., quickly, without error) reach a desired levelness. Thus, relying on the bubble level and the digital level to display levelness may result in inaccurate readings that require clear line of sight and user analysis (e.g., analysis of proximity of the bubble to the center), non-intuitive use, difficulties for a user to operate, require a long learning period on how to operate correctly, and/or provide a lack of direction in how to efficiently reach a desired levelness.

SUMMARY

The disclosure herein provides systems, methods and techniques of detecting and displaying levelness of a surface and that may overcome the aforementioned and other difficulties of presently available systems, methods and techniques. For example, at least one aspect is directed to an electronic level system. The electronic level system may include one or more sensing elements configured to detect levelness of the electronic level, a display including multiple output display elements arranged in an array that extends in a direction along a longitudinal axis of the electronic level and configured to display an indication of the levelness of the electronic level based on input from the one or more sensing elements, and a controller coupled with the one or more sensing elements and the multiple output display elements. The controller may be configured to activate the one or more sensing elements to detect the levelness and activate one or more of the multiple output display elements to display the indication based on the levelness.

At least one aspect is directed to a display for an electronic level. The display may include multiple output display elements arranged in an array that extends in a direction along a longitudinal axis of the electronic level and configured to display an indication of the levelness of the electronic level based on input from one or more sensing elements of the electronic level and a controller coupled with the multiple output display elements and the one or more sensing elements. The controller may be configured to activate the one or more sensing elements to detect the levelness and activate one or more of the multiple output display elements to display the indication based on the levelness.

The techniques described herein may result in various advantages over the aforementioned difficulties. For example, adopting the electronic level display may allow for increased accuracy in determining the levelness of an object, intuitive determinations, increased visibility, and improved efficiency, among other advantages.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
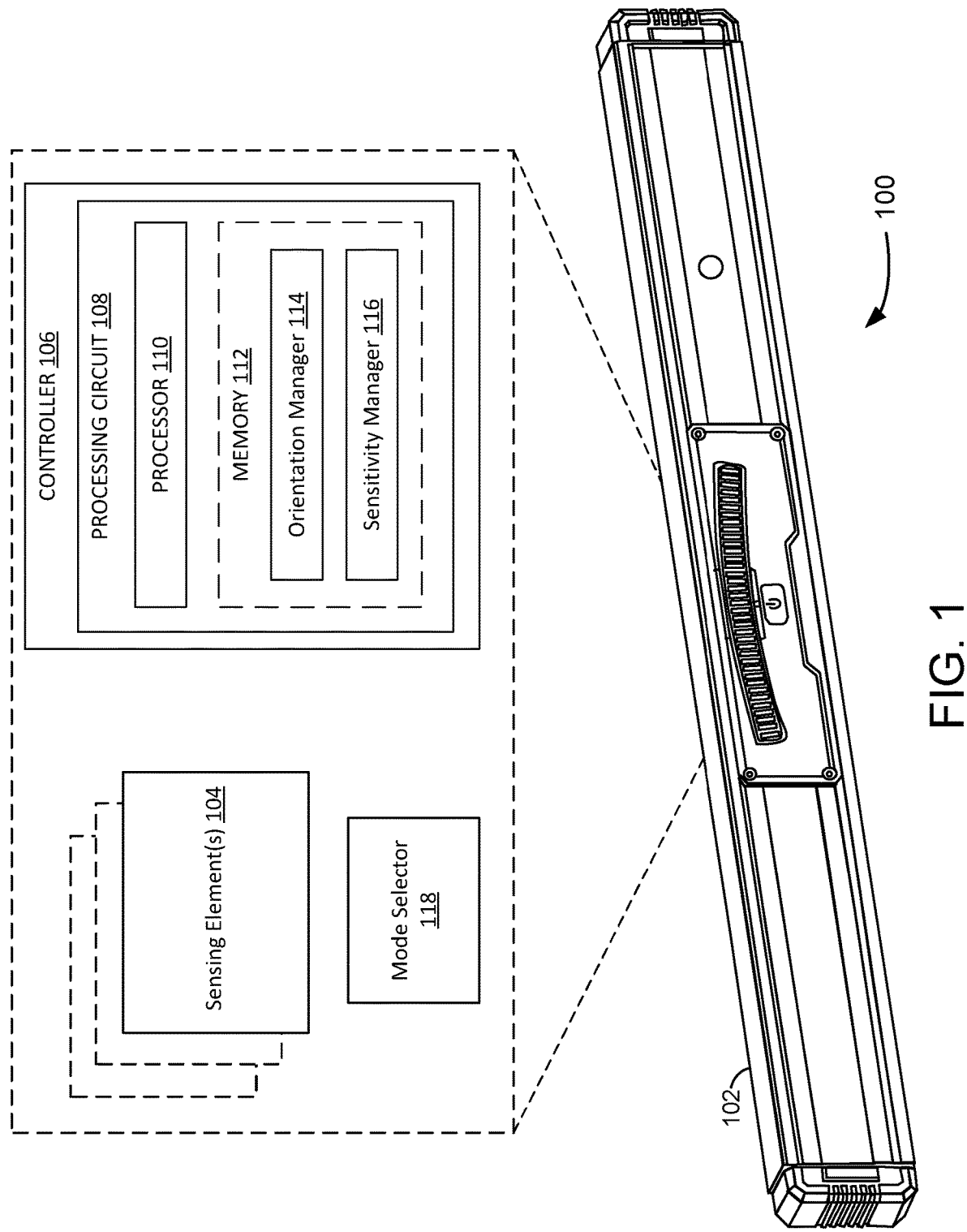
FIG. 1 is an electronic level system, in accordance with various implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 is a system 100 for an electronic level, according to one embodiment. The system 100 may include an electronic level 102, one or more sensing elements 104, a controller 106, or a mode selector 118. The controller 106 may include a processing circuit 108, a processor 110, and memory 112. The memory 112 may further include an orientation manager 114 and a sensitivity manager 116, in some embodiments. In some examples, the system 100 includes a battery, wherein the system 100 is powered by the battery. In brief overview, components 114, 116, and 118 may support displaying an indication of levelness using output from the sensing elements 104.

The sensing elements 104 may include apparatuses, hardware, components, or other elements to sense (e.g., detect, read) a levelness of the electronic level 102. In a first example, the sensing elements 104 may include one or more accelerometers. Accelerometers can sense various forces, such as gravitational forces on a body. Based on sensing the forces, the accelerometers or the controller 106 can determine levelness. In some cases, the accelerometers may sense in two axes or three axes. In another example, the sensing elements 104 may include lasers or lights. For example, light sensors may detect the light from the lasers or lights to determine a position of a bubble in a bubble vial. Based on the position, the sensing elements 104 or the controller 106 can determine levelness. In yet another example, the sensing elements 104 may include probes. For example, the probes may be inserted into a bubble vial to sense conductivity through the fluid of the bubble vial. Based on the conductivity, the sensing elements 104 may determine a position of the fluid in the vial and therefore the angle of the electronic level 102 (e.g., levelness). In another example, the sensing elements 104 may include capacitive sensors. For example, the capacitive censors may sense capacitance of a bubble (e.g., by treating a body of liquid as a dielectric of a capacitor). By determining a position of the liquid in the bubble vial, the sensing elements 104 or the controller 106 may determine the levelness of the electronic level 102. In some cases, the sensing elements 104 are mounted to a shock isolating media, the shock isolating media mounted to the electronic level.

In some embodiments, the sensing elements 104 may include a light sensor. The light sensor may determine whether the surrounding environment is a dim environment or a bright environment. For example, the light sensor may detect an amount (e.g., intensity, strength, wavelength) of light in an environment surrounding the electronic level 102.

The processing circuit 108 may be structured or configured to execute or implement instructions, commands, and/or control processes described herein with respect to the controller 106. The depicted configuration represents the processing circuit 108 as instructions stored in non-transitory machine or computer-readable media. However, this illustration is not meant to be limiting as the present disclosure contemplates other embodiments (e.g., the processing circuit 108 may be configured as a hardware unit). All such combinations and variations are intended to fall within the scope of the present disclosure.

The processor 110 may be one or more of a single- or multi-chip processor, a digital signal processor (DSP), an application specific integrated circuit (ASIC), a field programmable gate array (FPGA), or other programmable logic device, discrete gate or transistor logic, discrete hardware components, another type of suitable processor, or any combination thereof designed to perform the functions described herein. In this way, the processor 110 may be a microprocessor, a state machine, or other suitable processor. The processor 110 also may be implemented as a combination of computing devices, such as a combination of a DSP and a microprocessor, a plurality of microprocessors, one or more microprocessors in conjunction with a DSP core, or any other such configuration. The memory 112 may store computer readable media. The computer readable media may include code, which may be written in any programming language including, but not limited to, Java or the like and any conventional procedural programming languages, such as the "C" programming language or similar programming languages. The computer readable program code may be executed by one processor, multiple processors, or multiple remote processors. In the latter scenario, the remote processors may be connected to each other through any type of network (e.g., CAN bus, etc.).

Alternatively, or additionally, the processor 110 may be structured to perform or otherwise execute certain operations independent of one or more co-processors. In some embodiments, two or more processors may be coupled via a bus to enable independent, parallel, pipelined, or multi-threaded instruction execution. All such variations are intended to fall within the scope of the present disclosure. In another configuration, the processing circuit 108 may be embodied as one or more circuitry components including, but not limited to, processing circuitry, network interfaces, peripheral devices, input devices, output devices, etc. In some embodiments, the processing circuit 108 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the processing circuit 108 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The memory 112 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 112 may be communicably coupled to the processor 110 to provide computer code or instructions to the processor 110 for executing at least some of the processes described herein. Moreover, the memory 112 may be or include tangible, non-transient volatile memory or non-volatile memory. Accordingly, the memory 112 may include database components, object code components, script components, or any other type of information structure for supporting the various activities and information structures described herein. For example, the memory 112 may include programmable instructions that, upon execution, cause the processor 110 to display an indication of levelness.

The mode selector 118 may be configured to select a mode from a set of modes of the electronic level 102. The set of modes may include various modes of sensitivity for detecting levelness, as described herein with reference to FIGS. 3A-C; a vertical mode and a horizontal mode, as described herein with reference to FIGS. 3A-4C; or a marble mode and a bubble mode, as described herein with reference to FIG. 5. In some cases, the mode selector 118 is a button, a switch, a touch display, or a component in wireless communication with a device (e.g., such that the device may transmit commands to the mode selector 118 to select the mode), among other possible implementations. In some cases, the mode may be selected automatically by the processing circuit.

Figure 2:
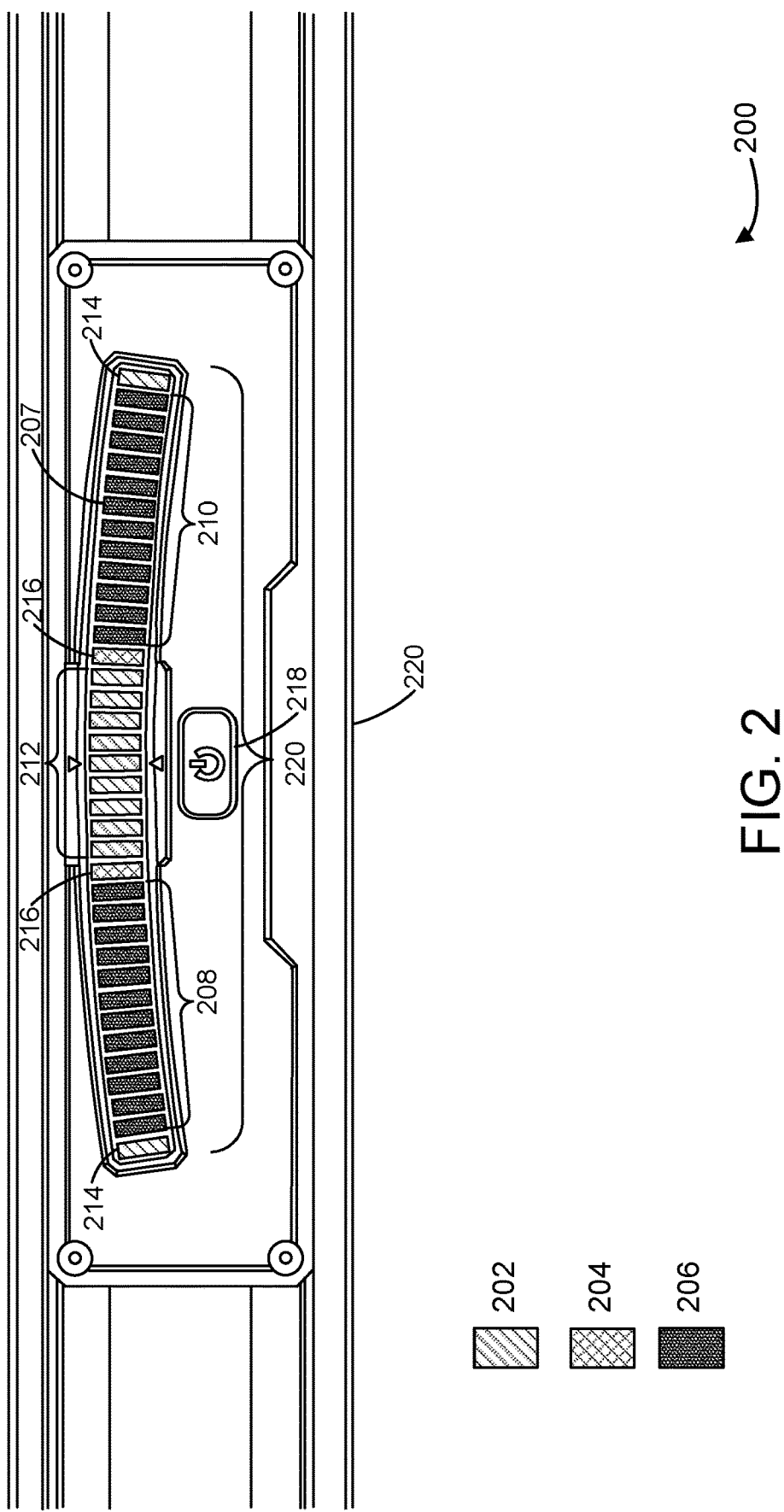
FIG. 2 is a display of an electronic level, in accordance with various implementations.

FIG. 2 is an illustration of a display 200 of an electronic level (e.g., an electronic level 102), in accordance with various implementations. The display 200 may include multiple output display elements 207 arranged in an array 220 that extends in a direction along a longitudinal axis of the electronic level. The array 220 may be arranged linearly, in a curved (e.g., arcuate) linear row, or in any configuration of adjacent output display elements 207. In some cases, the array 220 may be a row of light emitting diodes (LEDs), a row of liquid crystal displays (LCDs), or another type of visual indicator. The array 220 may be arranged with a slight curve such that a middle 212 (e.g., a medial portion) of the series of output display elements 207 is raised, relative to the ends (e.g., a first lateral portion 208 and a second lateral portion 210) when a reference surface 220 of the electronic level is on the bottom.

The array 220 may include any number of output display elements 207. The array 220 may include indicator display elements 214 (e.g., levelness indicators); a first set of display elements 207 within the first portion 208, a second set of display elements 207 within the second portion 210, and a third set of display elements 207 within the middle portion 212 (e.g., traveling sets of display elements); and guide elements 216 (e.g., markers, guides) that are configured to support perception of the middle 212 (e.g., a center of the array 220). In some embodiments, the various display elements 207 may be uniform in shape and size or include differing shapes and sizes. In some cases, the various display elements 207 may emit different colors. For example, the indicator display elements 214 and the third set within the middle 212 may emit a first color 202 (e.g., green). The guide elements 216 may emit a second color 204 (e.g., yellow). The first and second set within the first portion 208 and the second portion 210 may emit a third color 206 (e.g., red). In some examples, the display elements 207 may support or be configured with any type of color (e.g., any band of light within the visible spectrum, all the same color, multiple colors at once, switching between colors, etc.).

During operation of the electronic level (e.g., while the electronic level is on), each display element 207 may be in a different state. For example, the display elements 207 may be in an on state (e.g., emitting light or depicting a color) or an off state (e.g., not emitting light, not depicting a color). The guide elements 216 may always be in the on state to support perception of the middle 212. For example, the guide elements 216 may be near (e.g., four elements away from a center display element 207) the middle 212 and equidistant from each other on opposite sides of the middle 212. In some cases, the guide elements 216 may be marks (e.g., painted marks, text, lines, raised material, etc.) of different shapes or sizes from the other display elements 207. The indicator display elements 214 may default to the off state. Responsive to the electronic level detecting a levelness value that satisfies a threshold (e.g., is within a defined tolerance of being level), the indicator display elements 214 (or other indicators) may switch to the on state (e.g., flash, stay on until the levelness value fails to satisfy the threshold).

The first, second, and third sets of display elements 207 may default to the off state and switch to the on state based on a detected levelness of the electronic level. For example, a group (e.g., a set) of display elements 207 (e.g., one, two, three, five, etc.) may be in an on state based on the levelness, as described herein with reference to FIGS. 3A-5. The group of display elements 207 may travel (e.g., move, turn off a previous display element 207 and turn on a next display element 207) to and from each of the portions 208, 212, and 210 based on the levelness (e.g., as the angle of the electronic level changes). For example, the traveling set may be activated at variable positions along the array 220 to be disposed entirely within the middle portion 212 when the levelness of the electronic level is within a levelness threshold and disposed at least partially within one of the first portion 208 and the second portion 210 when the levelness is outside the levelness threshold. The group of display elements 207 may travel in a direction that is substantially in parallel with the reference surface 220 of the electronic level. In some cases, the group of display elements 207 may be a segment of an LCD display.

In some cases, the display 200 may include a button 218 (e.g., a switch). The button 218 may be configured to change a state of the electronic level. For example, the electronic level may switch from an on state to an off state, or from an off state to an on state, based on an activation (e.g., a press) of the button 218. In some implementations, the button 218 may be configured to change a mode of the electronic level based on activation of the button 218 (e.g., a number of contiguous presses, a duration of activation, etc.).

In some implementations, the display elements 207 may support adjustable levels of output. For example, the display elements 207 may output light at varying strengths (e.g., brightness). The electronic level may detect (e.g., via a light sensor) a brightness of a surrounding environment. The electronic level may adjust a level of brightness for the display elements 207 based on the detected brightness of the surrounding environment. For example, to improve battery life while maintaining visibility, the display elements 207 may output a lower level of light in dim environments and a higher level of light in bright environments.

In some examples, the display 200 may be on a first surface and a second surface of the electronic level. For example, the display 200 may include a first presentation surface and a second presentation surface. The first presentation surface may be positioned on an anterior side of the electronic level (e.g., a front of the electronic level) and the second presentation surface may be positioned on a posterior side of the electronic level (e.g., a back of the electronic level). In some implementations, each display element 207 may include a respective illumination source (e.g., a single LED), such that a first display element 207 on the first presentation surface and a second display element 207 on the second presentation surface (e.g., elements directly behind each other) share the same illumination source and simultaneously display an indication of levelness.

The described types and numbers of display elements 207 are illustrated as an example. Any number and type of output display elements 207 that can be used to indicate levelness of the electronic level may be implemented by the system as described herein.

Figure 3A:
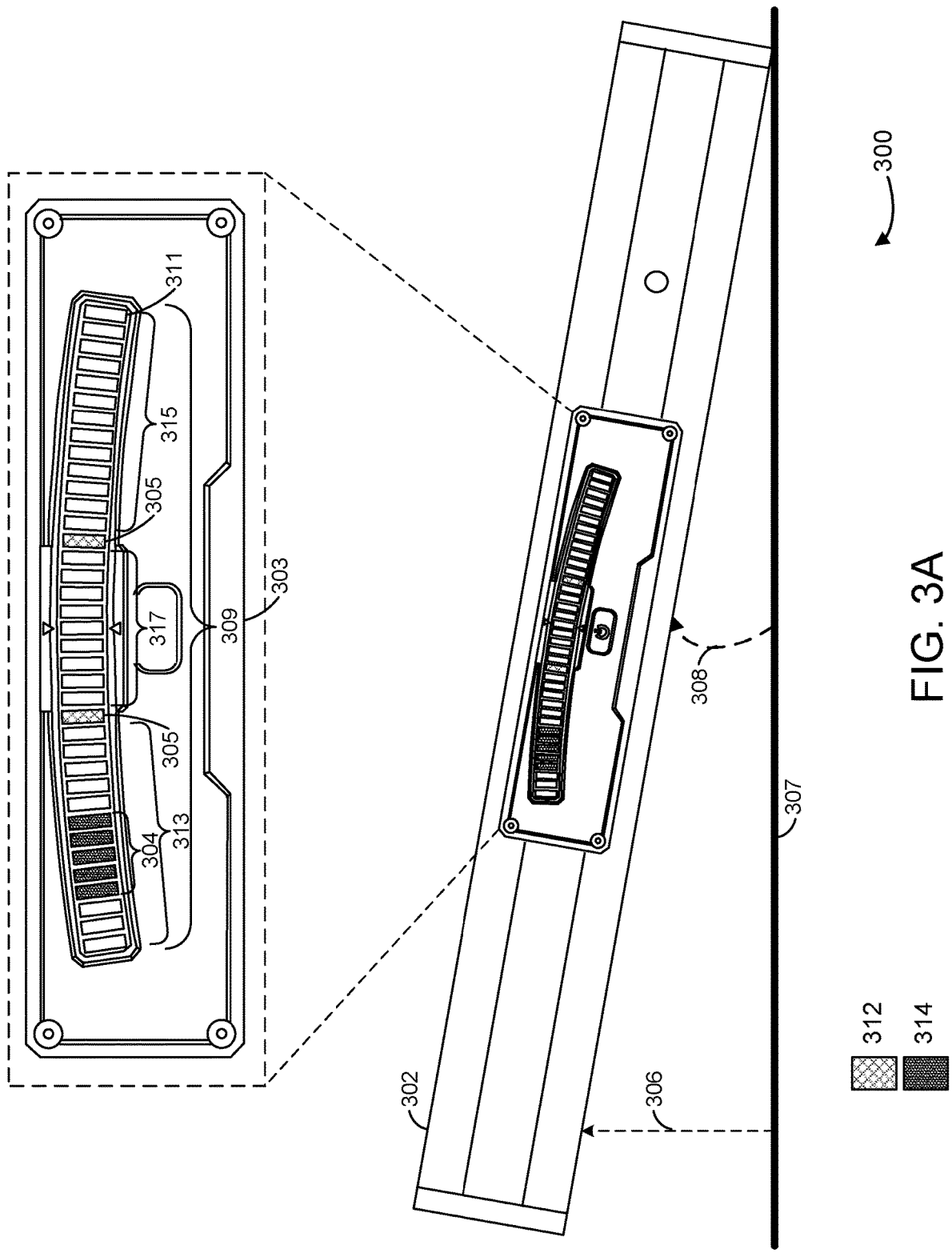
FIGS. 3A-5 are illustrations of operation of electronic levels, in accordance with various implementations.
Figure 3B:
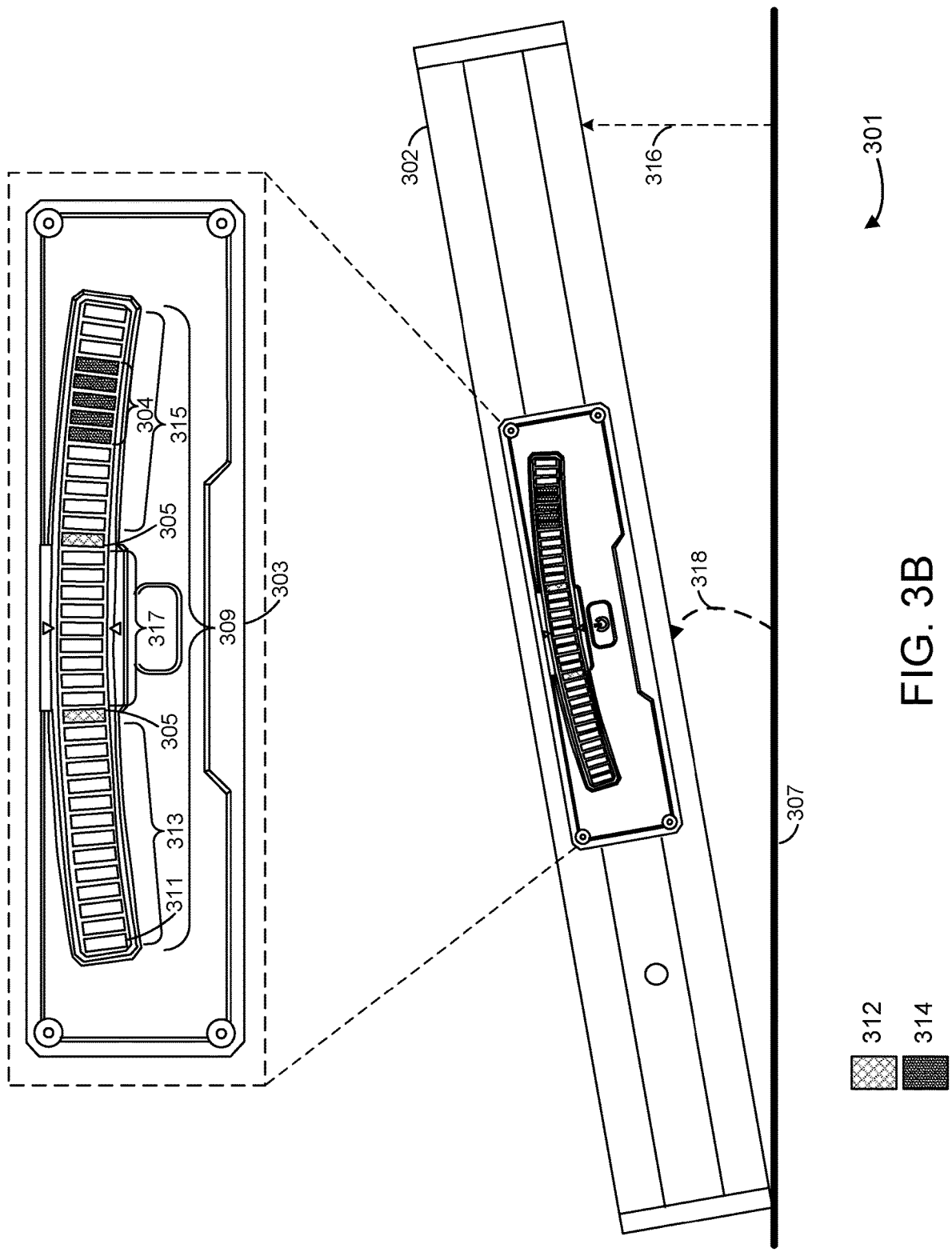
Figure 3C:
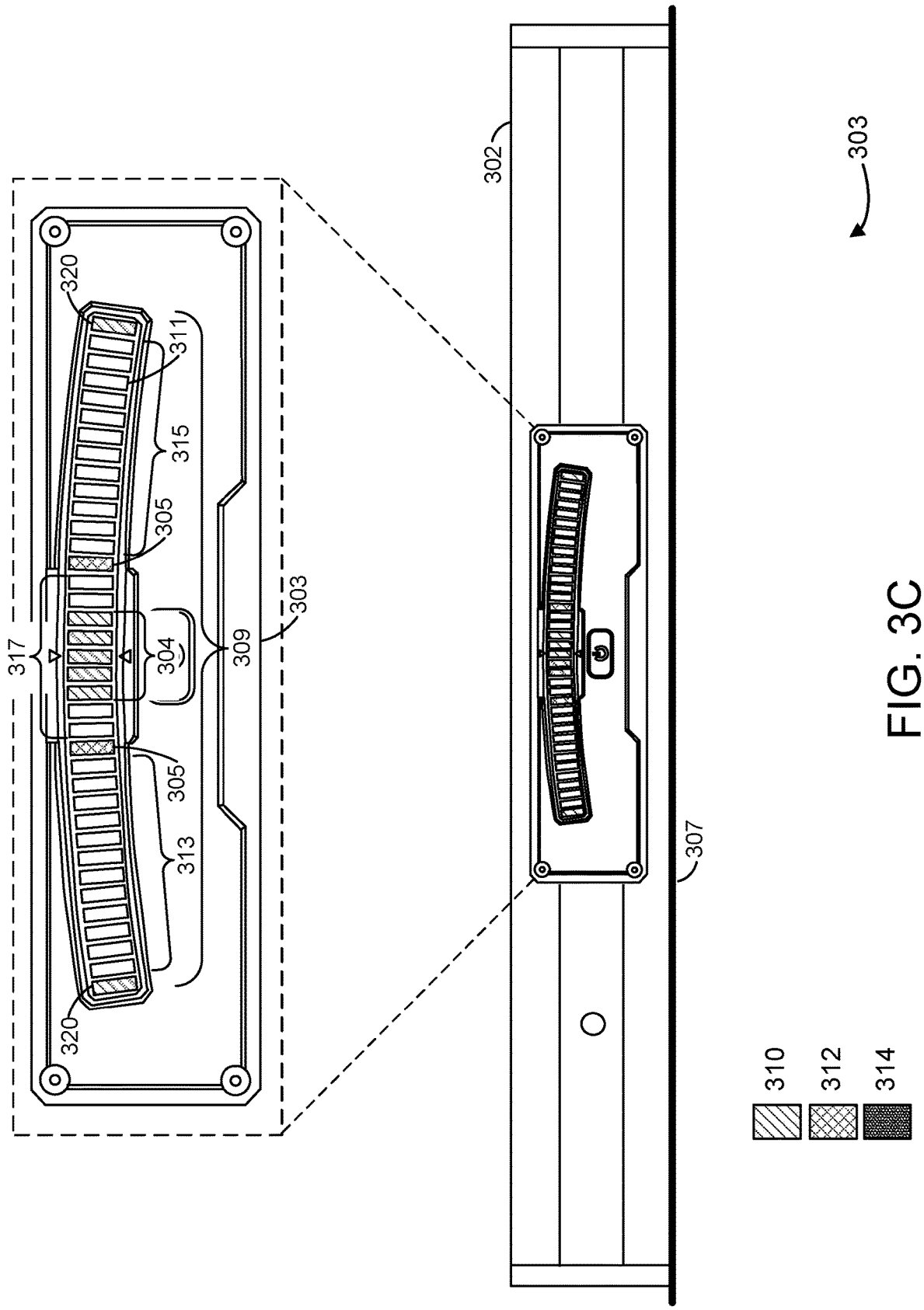

FIGS. 3A-C are illustrations of electronic level systems 300, 301, and 303, respectively, in accordance with various implementations. The systems 300, 301, and 303 may include an electronic level 302 in various orientations in relation to a plane 307. In some cases, the plane 307 may be a surface of an object (e.g., a strut, a wall, a shelf, etc.). The electronic level 302 may include a display 303 that includes an array 309 of multiple output display elements 311. The array 309 may include one or more guides (e.g., markers) 305 and a group of traveling indicators 304. The guides 305 may be elements 207 that are always in an on state while operating the electronic level 302. While in the on state, the guides 305 may support perception of a center of the array 309. The guides 305 may output a first color 312 (e.g., yellow). The group of traveling indicators 304 may be consecutively adjacent output display elements 311 that are in an on state while operating the electronic level 302. The traveling indicators 304 may travel (e.g., move) across the array 309 based on the levelness of the electronic level 302.

In the example of FIG. 3A, the electronic level 302 displays an example of a first indication of levelness. The traveling indicators 304 may display the first indication based on input from one or more sensing elements (e.g., sensing elements 104). For example, a first end (e.g., the leftmost end) of the electronic level 302 may be lifted a distance 306 from the plane 307. A second end of the electronic level 302 may be positioned at the plane 307 such that the electronic level 302 is oriented at an angle 308 in relation to the plane 307. The sensing elements may detect the angle 308 and determine a levelness of the electronic level 302. Based on determining the levelness of the electronic level 302, the electronic level 302 may display the first indication of levelness by moving the traveling indicators 304 to be located at a first lateral portion 313 of the array 309. The traveling indicators 304 may output a second color 314 (e.g., red) based on being in the first lateral portion 313.

To do so, the electronic level 302 may shift (e.g., increment, move) the traveling indicators 304. For example, the traveling indicators 304 may travel by displacing from a prior position to a new position by a single output display element (e.g., to simulate fluid movement, to not jump and to appear more natural). If the traveling indicators 304 were to start in the middle portion 317 of the array 309, upon determining the angle 308, a first display element of the traveling indicators 304 may switch to the off state (e.g., no longer being a part of the traveling indicators 304) and a second display element (e.g., a next display element in the direction of movement of the traveling indicators 304) may switch to the on state (e.g., now being a part of the traveling indicators 304). In this way, the traveling indicators 304 may move from the middle portion 317 to the first lateral portion 313 (e.g., due to the first end being a distance 306 from the plane 307). In some cases, the traveling indicators 304 may move by displacing from a prior position to a new position by multiple output display elements 311.

In some cases, the location of the traveling indicators 304 may be based on a sensitivity level, mapping, or mode of the electronic level. The electronic level 302 may increment the traveling indicators 304 across the display 303 based on a change of the levelness from a first levelness value to a second levelness value when the change satisfies a threshold. For example, each increment (e.g., shift of position, movement to a next display element) of the traveling indicators 304 may correspond to the change in levelness of the electronic level 302. Based on the sensitivity of the electronic level 302, each increment may correspond to an amount of change in the levelness. For example, according to a first sensitivity mode, the increment may correspond to a change of 0.029 degrees (e.g., a shift in levelness of 1/16" over a 4' level). According to a second sensitivity mode, the increment may correspond to a change of 0.05 degrees, 0.10 degrees, among other amounts, allowing for more precise or less precise displays of levelness. In some cases, a user may select the sensitivity mode from a set of sensitivity modes (e.g., via user input, pressing a button, etc.), adjust the sensitivity mode, or program the sensitivity mode.

In some examples, the levels of sensitivity may be variable. For example, the different portions 313, 315, and 317 of the array 309 may map to different levels of sensitivity. In a first example, as the traveling indicators 304 move closer to the middle portion 317, the levels of sensitivity may increase (e.g., thresholds of sensitivity may increase). Near the ends of the electronic level, each shift of the traveling indicators 304 may correspond to a change in angle of 0.25 degrees. Near the center of the electronic level, each shift of the traveling indicators 304 may correspond to a change in angle of 0.05 degrees. In some cases, each display element may be mapped to a different sensitivity threshold, groups of display elements may be mapped to different sensitivity thresholds, or each display element may share a same sensitivity threshold.

In some cases, the electronic level may average readings. For example, the electronic level may combine (e.g., average) multiple readings from the sensing elements before determining which display elements to include in the traveling indicators 304. By combining (e.g., averaging) multiple readings, the readings can be more stable and provide a better user experience. In some examples, the averaging is a trailing average of readings.

In the example of FIG. 3B, the electronic level 302 displays an example of a second indication of levelness. The traveling indicators 304 may display the second indication based on input from the sensing elements. For example, the second end (e.g., the rightmost end) of the electronic level 302 may be lifted by a distance 316 from the plane 307. The first end of the electronic level may be positioned at the plane 307 such that the electronic level 302 is oriented at an angel 318 in relation to the plane 307. The sensing elements may detect the angle 318 and determine a levelness of the electronic level 302. Based on determining the levelness of the electronic level 302, the electronic level 302 may display the second indication of levelness by moving the traveling indicators 304 to be located at a second lateral portion 315 of the array 309. The traveling indicators 304 may output the second color 314 (e.g., red) based on being in the second lateral portion 315.

In the example of FIG. 3C, the electronic level 302 displays an example of a third indication of levelness. The traveling indicators 304 may display the third indication based on input from the sensing elements. For example, both ends of the electronic level may be positioned at the plane 307 such that the electronic level 302 is oriented parallel to the plane 307. The sensing elements may detect the parallel orientation and determine a levelness of the electronic level 302 to be level (e.g., at an angle of inclination of approximately 0 degrees). Based on determining the levelness of the electronic level 302, the electronic level 302 may display the third indication of levelness by moving the traveling indicators 304 to be located at a medial portion 317 of the array 309. The traveling indicators 304 may output a third color 310 (e.g., green) based on being in the medial portion 317. In some cases, all the output display elements 311 in the medial portion 317 are of the third color (e.g., illuminate the third color when activated).

In some cases, the third indication of levelness is an indication that the electronic level 302 is level with the plane 307 (e.g., within a defined tolerance of being level or parallel to the plane 307). Responsive to detecting the electronic level 302 is level, leveled indicators 320 are switched to the on state (e.g., flash, maintain being in the on state until the electronic level 302 is no longer level) to indicate the electronic level 302 is level. The leveled indicators 320 may output the third color 310. In some examples, the leveled indicators 320 may be located at each end of the array 309 or another location on the electronic level. In some implementations, the leveled indicators 320 are speakers that emit a sound to indicate the electronic level 302 is level.

In some implementations, a combination of the FIGS. 3A-C is possible. For example, the traveling indicators 304 may be partially disposed within both the medial portion 317 and one of the first lateral portion 313 or the second lateral portion 315. In such cases, the traveling indicators 304 may include multiple colors (e.g., both green and red based on the position of the display elements).

Figure 4A:
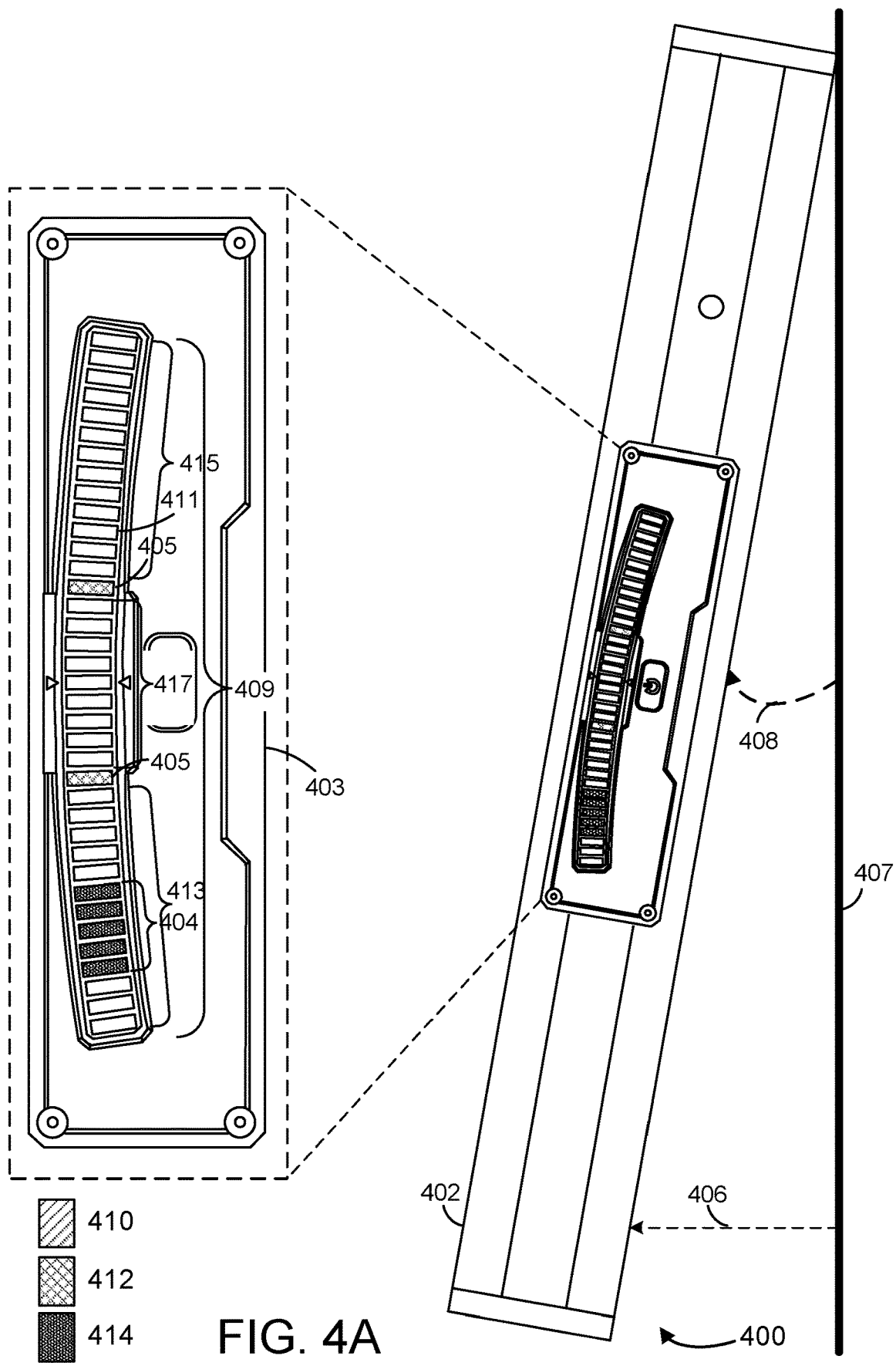
Figure 4B:
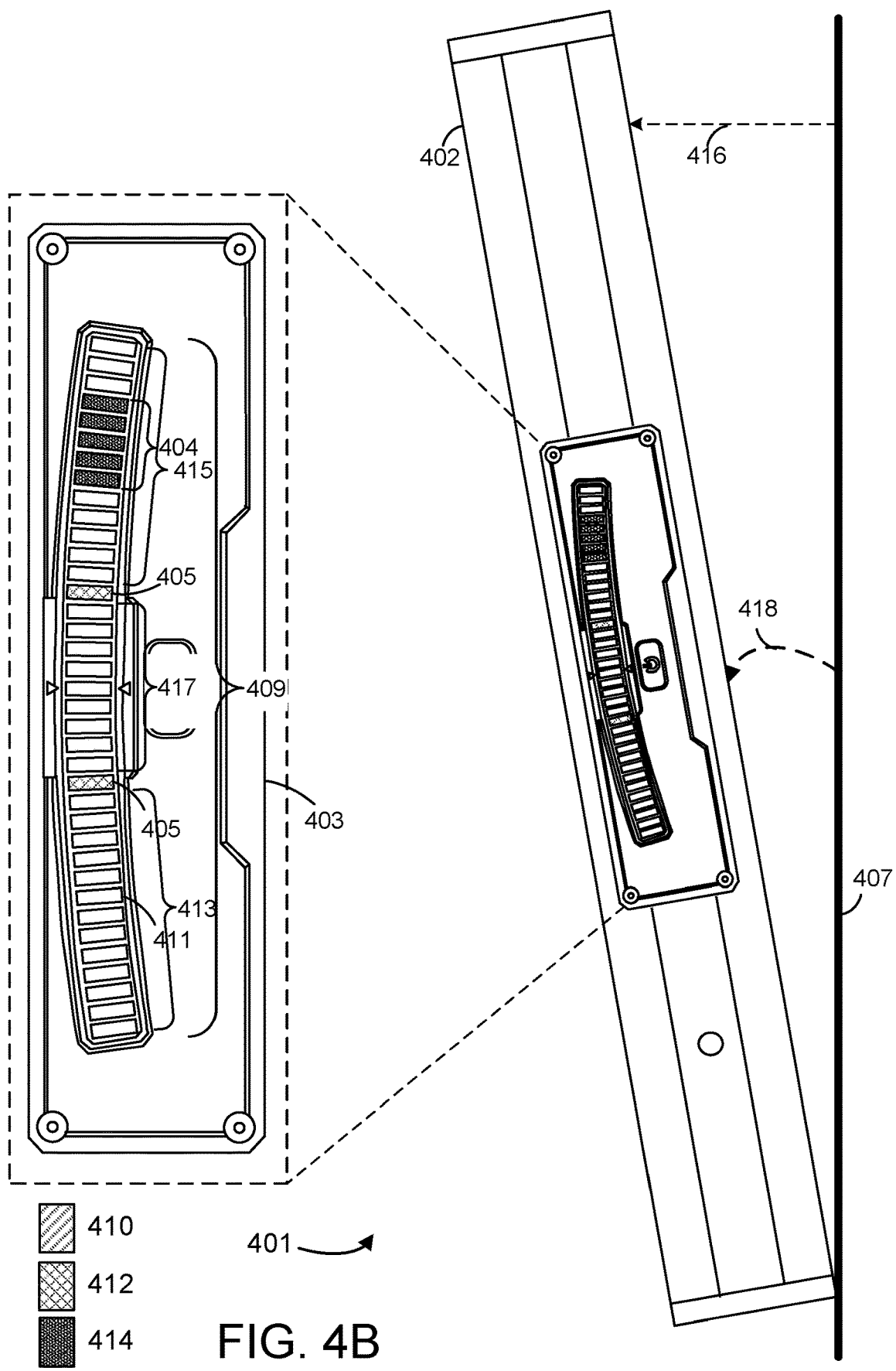
Figure 4C:
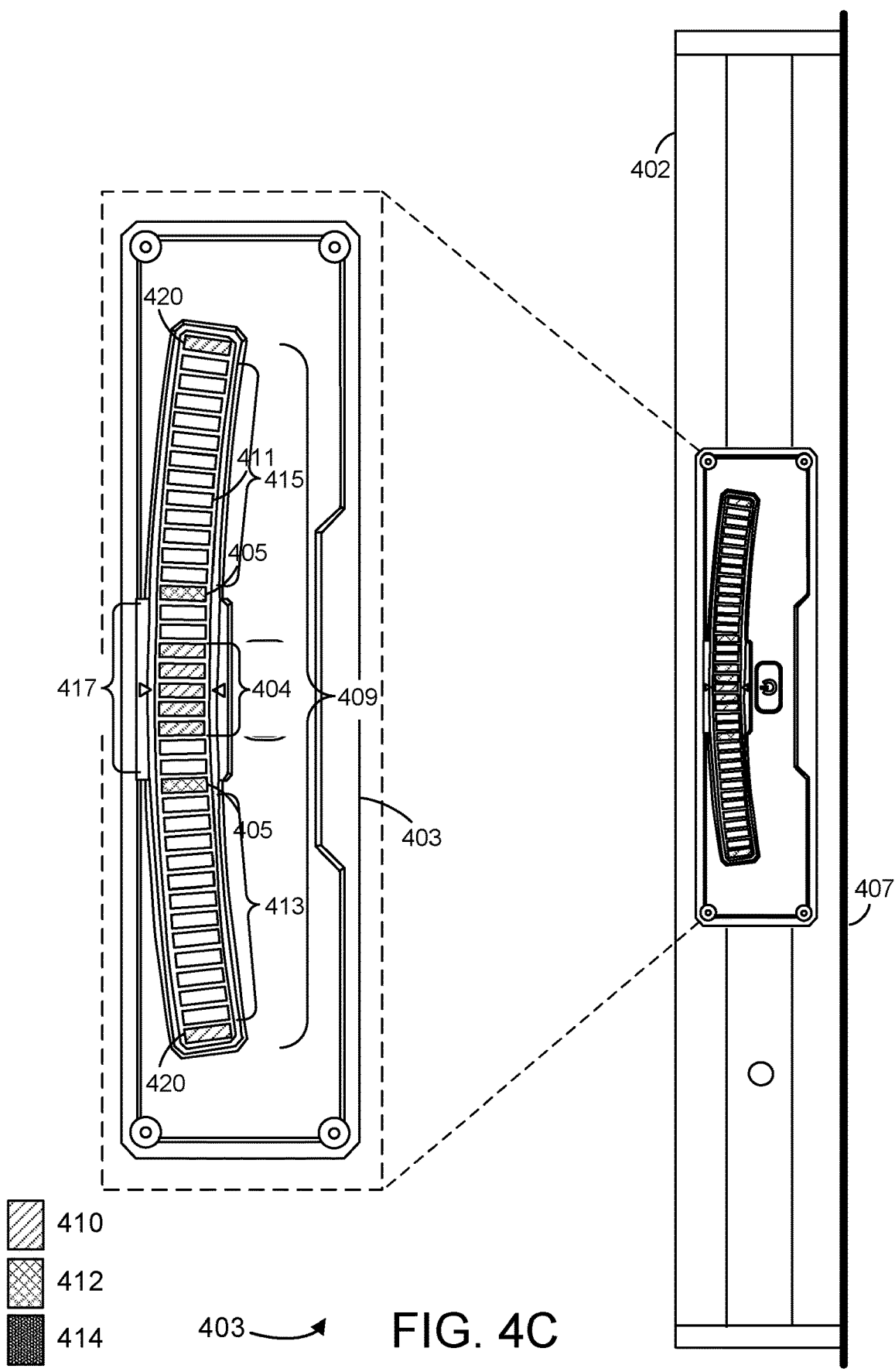

FIGS. 4A-C are illustrations of electronic level systems 400, 401, and 403, respectively, in accordance with various implementations. The systems 400, 401, and 403 may include an electronic level 402 in various orientations in relation to a plane 407. In some cases, the plane 407 may be a surface of an object (e.g., a strut, a wall, a shelf, etc.). The electronic level 402 may include a display 403 that includes an array 409 of multiple output display elements 411. The array 409 may include one or more guides (e.g., markers) 405 and a group of traveling indicators 404. The guides 405 may be display elements 411 that are always in an on state while operating the electronic level 402. While in the on state, the guides 405 may support perception of a center of the array 409. The guides 405 may output a first color 412 (e.g., yellow). The group of traveling indicators 404 may be consecutively adjacent output display elements 411 that are in an on state while operating the electronic level 402. The traveling indicators 404 may travel (e.g., move) across the array 409 based on the levelness of the electronic level 402.

In the example of FIG. 4A, the electronic level 402 displays an example of a first indication of levelness. The traveling indicators 404 may display the first indication based on input from one or more sensing elements (e.g., sensing elements 104). For example, a first end (e.g., the leftmost end) of the electronic level 402 may be lifted a distance 406 from the plane 407. A second end of the electronic level 402 may be positioned at the plane 407 such that the electronic level 402 is oriented at an angle 408 in relation to the plane 407. The sensing elements may detect the angle 408 and determine a levelness of the electronic level 402. Based on determining the levelness of the electronic level 402, the electronic level 402 may display the first indication of levelness by moving the traveling indicators 404 to be located at a first lateral portion 413 of the array 409. The traveling indicators 404 may output a second color 414 (e.g., red) based on being in the first lateral portion 413.

In some cases, the sensing elements may detect the angle 408 and determine an orientation of the electronic level 402. For example, the electronic level 402 and the plane 407 may be oriented vertically (e.g., rather than the horizontal orientation illustrated in FIGS. 3A-C). The sensing elements may detect the vertical orientation of the electronic level 402 and automatically select (e.g., switch to) an orientation mode from a set of orientation modes. In some examples, the sensing elements may detect an orientation value. Based on whether the orientation value satisfies an orientation threshold (e.g., the electronic level is oriented at greater than a 45 degree angle in relation to a horizontal plane), the electronic level may select a first orientation mode (e.g., a vertical mode) or a second orientation mode (e.g., a horizontal mode). In horizontal mode, the traveling indicators 404 may travel to the center of the display 403 when the electronic level 404 is parallel to a horizontal surface. In vertical mode, the traveling indicators 404 may travel to the center of the display 403 when the electronic level 404 is parallel to a vertical surface.

In the example of FIG. 4B, the electronic level 402 displays an example of a second indication of levelness. The traveling indicators 404 may display the second indication based on input from the sensing elements. For example, the second end (e.g., the rightmost end) of the electronic level 402 may be lifted a distance 416 from the plane 407. The first end of the electronic level 402 may be positioned at the plane 407 such that the electronic level 402 is oriented at an angle 418 in relation to the plane 407. The sensing elements may detect the angle 418 and determine a levelness of the electronic level 402. Based on determining the levelness of the electronic level 402, the electronic level 402 may display the second indication of levelness by moving the traveling indicators 404 to be located at a second lateral portion 415 of the array 409. The traveling indicators 404 may output the second color 414 (e.g., red) based on being in the second lateral portion 415.

In the example of FIG. 4C, the electronic level 402 displays an example of a third indication of levelness. The traveling indicators 404 may display the third indication based on input from the sensing elements. For example, both ends of the electronic level 402 may be positioned at the plane 407 such that the electronic level 402 is oriented parallel to the plane 407. The sensing elements may detect the parallel orientation and determine a levelness of the electronic level 402 to be level (e.g., approximately 0 degrees). Based on determining the levelness of the electronic level 402, the electronic level 402 may display the third indication of levelness by moving the traveling indicators 404 to be located at a medial portion 417 of the array 409. The traveling indicators 404 may output a third color 410 (e.g., green) based on being in the medial portion 417. In some cases, leveled indicators 420 may be switched to the on state (e.g., flash, maintain being in the on state until the electronic level 402 is no longer level) to indicate the electronic level 402 is level. The leveled indicators 420 may output the third color 410.

Figure 5:
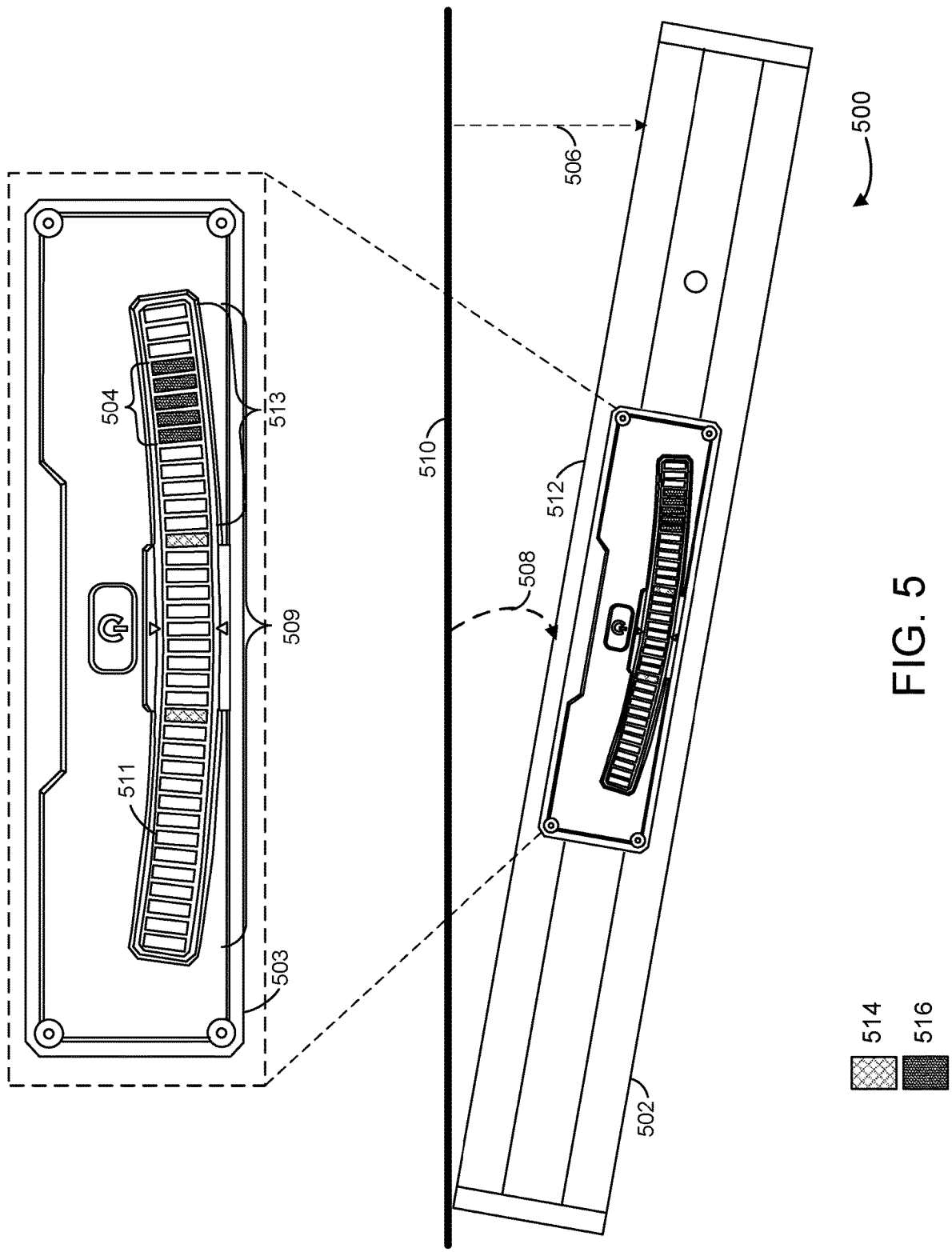

FIG. 5 is an illustration of an electronic level system 500, in accordance with various implementations. The system 500 may include an electronic level 502 in an orientation in relation to a plane 510. The orientation of the electronic level 502 may dispose or otherwise allow a display 503 to mimic a marble level (e.g., a marble moves along an arc having upward concavity to indicate levelness), rather than a bubble level as may be mimicked by the displays described above in FIGS. 3A-3C. In some cases, the plane 510 may be a surface of an object (e.g., a strut, a ceiling, a shelf, etc.). The electronic level 502 may include the display 503 that includes an array 509 of multiple output display elements 511. The array 509 may include a group of traveling indicators 504. The group of traveling indicators 504 may be consecutively adjacent output display elements 511 that are in an on state while operating the electronic level 502. The traveling indicators 504 may travel (e.g., move) across the array 509 based on the levelness of the electronic level 502.

The electronic level 502 may display an indication of levelness based on input from one or more sensing elements (e.g., sensing elements 104). For example, a first end (e.g., the rightmost end) of the electronic level 502 may be lifted a distance 506 from the plane 510. A second end of the electronic level 502 may be positioned at the plane 510 such that the electronic level 502 is oriented at an angle 508 in relation to the plane 510. The sensing elements may detect the angle 508 and determine a levelness of the electronic level 502. Based on determining the levelness of the electronic level 502, the electronic level 502 may display the indication of levelness by moving the traveling indicators 504 to be located at a first lateral portion 513 of the array 509. The traveling indicators 504 may output a second color 516 (e.g., red) based on being in the first lateral portion 513.

In some cases, the sensing elements may detect the angle 508 and determine an orientation of the electronic level 502. For example, the electronic level 502 and the plane 507 may be oriented horizontally, however, the electronic level 502 may be inverted in relation to a reference surface 512 of the electronic level as compared to the orientation illustrated in FIGS. 1-4C. The sensing elements may detect the inverted orientation of the electronic level 502 and automatically select (e.g., switch to) a traveling mode from a set of traveling modes (e.g., bubble mode or marble mode). In some examples, the sensing elements may detect an orientation value. Based on whether the orientation value satisfies an orientation threshold (e.g., the electronic level is rotated at greater than a 90-degree angle in relation to the reference surface 512), the electronic level may select a first traveling mode (e.g., a bubble mode) or a second orientation mode (e.g., a marble mode). In bubble mode, the traveling indicators 504 may travel toward the higher end of the electronic level 504 (e.g., simulating a movement of a bubble within an encapsulated liquid when the electronic level 504 is oriented with the arcuate array 509 having downward concavity), as illustrated in FIGS. 3A-4C. In marble mode, the traveling indicators 504 may travel to the lower end of the electronic level 504 (e.g., simulating a movement of a marble rolling on a concave surface when the electronic level 504 is oriented with the arcuate array 509 having an upward concavity), as illustrated in FIG. 5. Marble mode may provide an increased sense of intuitiveness for a user, especially when the electronic level is inverted.

Figure 6:
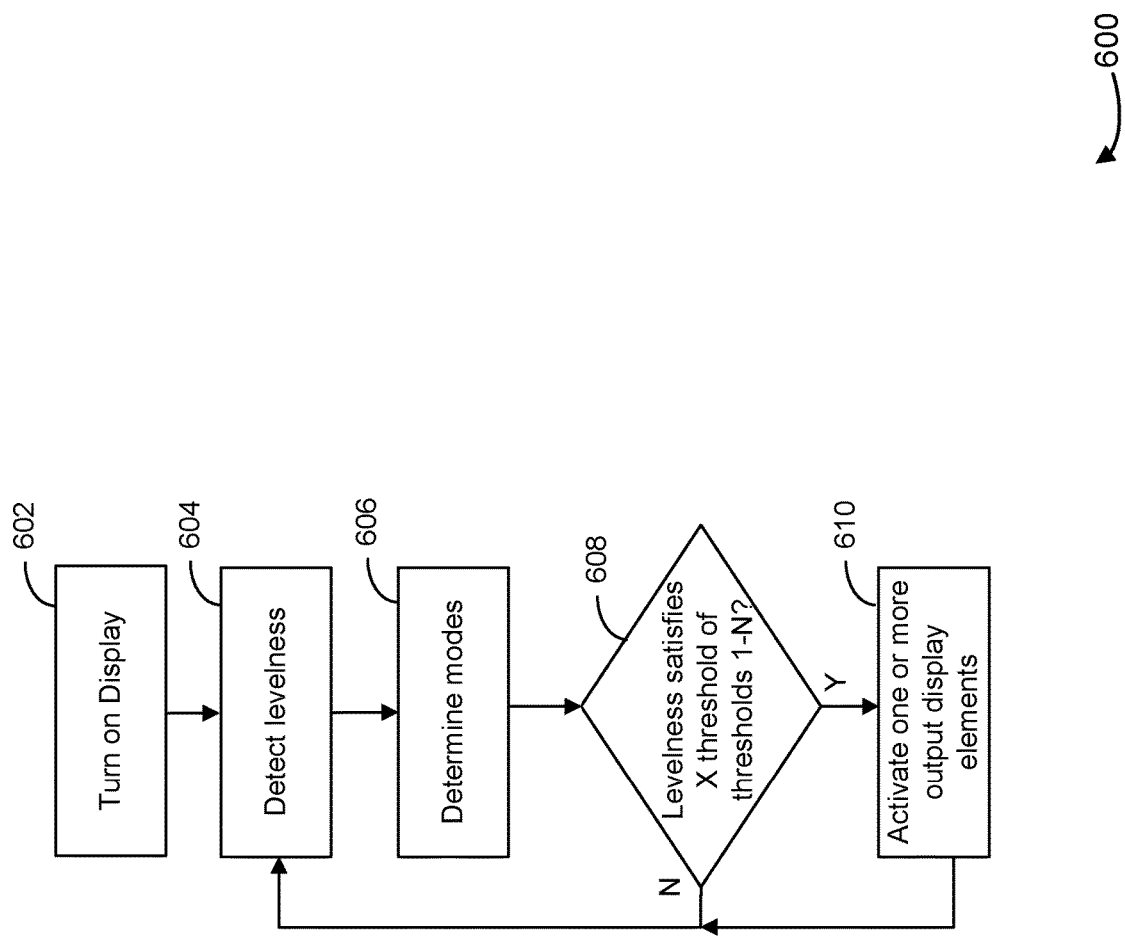
FIG. 6 is a diagram of a method for operation of an electronic level, in accordance with an implementation.

FIG. 6 is a method 600 for using an electronic level system, in accordance with an implementation. The method 600 includes execution steps 602-610. However, it should be appreciated that other embodiments may comprise additional or alternative steps, or may omit one or more steps altogether. It should also be appreciated that other embodiments may perform certain execution steps in a different order. Steps discussed herein may also be performed simultaneously or near-simultaneously. FIG. 6 is described as being performed by a controller of the electronic system that is coupled with one or more sensing elements and multiple output display elements. In some cases, the output display elements may be arranged linearly along the electronic level parallel to a base (e.g., a reference surface) of the electronic level.

At step 602, the controller turns on a display. A user of the electronic level system may provide user input. For example, the user may press a button (e.g., flip a switch, press a touch display element, etc.). Based on the user input, the controller may turn on the display and activate the sensing elements and the output display elements (e.g., pull power from a battery of the electronic level system).

At step 604, the sensing elements detect a levelness of the electronic level system. For example, the sensing elements may detect the levelness via a laser, one or more accelerometers, one or more probes, one or more capacitive sensors, or any combination thereof, as described herein with reference to FIG. 1.

At step 606, the controller determines one or more modes. The controller may determine the modes based on the detected levelness of the sensing elements. For example, the controller may determine an orientation of the electronic level based on the levelness. If the orientation of the electronic level is mostly vertical, horizontal, upside down, or right side up, the electronic level may select a corresponding mode of operation (e.g., orientation modes and traveling modes as described herein with reference to FIGS. 4A-5). In some cases, the controller may determine a sensitivity mode based on user input or may be preconfigured with the sensitivity mode. For example, the electronic level may default to a first sensitivity mode of a set of sensitivity modes. The user may provide user input (e.g., via a button, switch, touch display element) to select another sensitivity mode from the set of sensitivity modes. Each sensitivity mode may change thresholds of sensitivity for moving a set of traveling indicators on the display of the electronic level, as described herein with reference to FIGS. 3A-C.

At step 608, the controller determines whether the detected levelness satisfies a first threshold of a set of thresholds. In some cases, each output display element of the electronic level may be associated with a levelness threshold. Based on the levelness thresholds, the electronic level may select a group of output display elements to switch to an on state. For example, if the level is at a 30 degree angle in relation to a surface, the electronic level may select a group of output display elements located at a first end of the display to turn on. If the corresponding output display elements are already in an on state, the controller may continue to step 604 to continue detecting new values of levelness. At step 610, the controller may activate (e.g., turn on) the respective output display elements (e.g., a traveling group of display elements). The traveling group (e.g., an indicating set) of display elements may be a subset of the multiple output display elements presented at variable positions within the multiple output display elements based on the levelness.

Some example implementations, according to the present disclosure, are now described.

Example 1. An electronic level, comprising: one or more sensing elements configured to detect levelness of the electronic level; a display comprising a plurality of output display elements arranged in an array that extends in a direction along a longitudinal axis of the electronic level and configured to display an indication of the levelness of the electronic level based on input from the one or more sensing elements; and a controller coupled with the one or more sensing elements and the plurality of output display elements, the controller configured to: activate the one or more sensing elements to detect the levelness; and activate one or more of the plurality of output display elements to display the indication based on the levelness.

Example 2. The electronic level of example 1 wherein the display of the electronic level comprises a first lateral portion, a second lateral portion, and a medial portion disposed between the first lateral portion and the second lateral portion, the controller further configured to: activate a traveling set of display elements of the plurality of output display elements, based on the levelness, wherein the traveling set is activated at variable positions along the plurality of output display elements to be disposed entirely within the medial portion when the levelness is within a levelness threshold and disposed at least partially within one of the first lateral portion and the second lateral portion when the levelness is outside the levelness threshold.

Example 3. The electronic level of example 2 wherein the traveling set comprises consecutively adjacent output display elements.

Example 4. The electronic level of example 2 wherein the traveling set is displaced from a prior position of the variable positions by a single output display element.

Example 5. The electronic level of example 2 wherein at least one of the variable positions is disposed within both the medial portion and one of the first lateral portion or the second lateral portion.

Example 6. The electronic level of example 1 wherein the controller is further configured to: select an indicator traveling mode from a set of indicator traveling modes based on an orientation value of the electronic level.

Example 7. The electronic level of example 1 wherein the controller is further configured to: select an orientation mode from a set of orientation modes based on whether an orientation value of the electronic level satisfies an orientation threshold, wherein the set of orientation modes comprises a vertical mode and a horizontal mode.

Example 8. The electronic level of example 1 wherein the controller is further configured to: activate a first output display element of the plurality and a second output display element of the plurality based on the levelness satisfying a threshold, wherein the first output display element and the second output display element are configured to indicate that the levelness of the electronic level is level.

Example 9. The electronic level of example 1 wherein the controller is further configured to: activate a first output display element of the plurality and a second output display element of the plurality based on whether the electronic level is on, wherein the first output display element and the second output display element are configured to indicate guides that support perception of a center of the array.

Example 10. The electronic level of example 1 wherein the controller is further configured to: increment the indication across the display based on a change of the levelness from a first levelness value to a second levelness value, wherein the change of the levelness satisfies a sensitivity threshold.

Example 11. The electronic level of example 7 wherein the controller is further configured to: select a sensitivity mode from a set of sensitivity modes based on user input, wherein the sensitivity threshold is based on the selected sensitivity mode.

Example 12. The electronic level of example 7 wherein the controller configured to increment the indication is further configured to: increment the indication based on a sensitivity mapping, the sensitivity mapping defining respective sensitivity thresholds for each output display element of the plurality.

Example 13. The electronic level of example 1 wherein a difference between a first levelness threshold associated with a first output display element and a second levelness threshold associated with a second output display element adjacent to the first output display element is greater than a difference between a third levelness threshold associated with a third output display element and a fourth levelness threshold associated with a fourth output display element adjacent to the third output display element.

Example 14. The electronic level of example 10 wherein the second output display element is adjacent to the third output display element.

Example 15. The electronic level of example 1 wherein the display comprises a first presentation surface positioned on an anterior side of the electronic level and a second presentation surface positioned on a posterior side of the electronic level.

Example 16. The electronic level of example 12 wherein: the plurality of output display elements is shared by the first presentation surface and the second presentation surface; and the plurality of output display elements are configured to simultaneously display the indication on both the first presentation surface and the second presentation surface.

Example 17. The electronic level of example 1 further comprising a light sensor configured to detect light, wherein the controller is further configured to change a brightness level of the output display elements based on the light.

Example 18. The electronic level of example 1 wherein: the display further comprises: a row comprising the plurality of output display elements, the row positioned generally parallel to a base of the electronic level; and a button, the controller further configured to activate the display based on input from the button.

Example 19. The electronic level of example 1 further comprising a leveled indicator to indicate when the electronic level is level.

Example 20. The electronic level of example 1 wherein the one or more sensing elements comprise one or more lasers configured to detect a position of a bubble within an encapsulated fluid to determine the levelness of the electronic level.

Example 21. The electronic level of example 1 wherein the one or more sensing elements comprise one or more capacitive sensors configured to detect a position of a bubble within an encapsulated fluid to determine the levelness of the electronic level.

Example 22. The electronic level of example 1 wherein the one or more sensing elements are mounted to a shock isolating media, the shock isolating media mounted to the electronic level.

Example 23. The electronic level of example 1 wherein the one or more sensing elements comprise one or more accelerometers configured to detect a force to determine the levelness of the electronic level.

Example 24. The electronic level of example 1 wherein: a medial set of output display elements of the plurality of output display elements display the indication of the levelness according to a first color, and other output display elements of the plurality of output display elements display the indication of the levelness according to a second color different from the first color.

Example 25. The electronic level of example 1 wherein the plurality of output display elements vary by changing in color.

Example 26. The electronic level of example 1 wherein the plurality of output display elements vary by changing in brightness.

Example 27. The electronic level of example 1 wherein the plurality of output display elements comprises an array of light emitting diodes (LEDs).

Example 28. The electronic level of example 1 further comprising a battery, wherein the display, the plurality of output display elements, and the controller are powered by the battery.

Example 29. The electronic level of example 1 wherein the controller is further configured to combine a plurality of levelness values, wherein the levelness comprises the combination.

Example 30. A display for an electronic level comprising: a plurality of output display elements arranged in an array that extends in a direction along a longitudinal axis of the electronic level and configured to display an indication of the levelness of the electronic level based on input from one or more sensing elements of the electronic level; and a controller coupled with the plurality of output display elements and the one or more sensing elements, the controller configured to: activate the one or more sensing elements to detect the levelness; and activate one or more of the plurality of output display elements to display the indication based on the levelness.

Example 31. The display of example 30 further comprising a first lateral portion, a second lateral portion, and a medial portion disposed between the first lateral portion and the second lateral portion, the controller further configured to: activate a traveling set of display elements of the plurality of output display elements, based on the levelness, wherein the traveling set is activated at variable positions along the plurality of output display elements to be disposed entirely within the medial portion when the levelness is within a levelness threshold and disposed at least partially within one of the first lateral portion and the second lateral portion when the levelness is outside the levelness threshold.

Example 32. The display of example 30 wherein the controller is further configured to: select an indicator traveling mode from a set of indicators traveling modes based on an orientation value of the electronic level.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "controller" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. An electronic level, comprising:
one or more sensing elements configured to detect levelness of the electronic level;
a display comprising a plurality of output display elements arranged in an array that extends in a direction along a longitudinal axis of the electronic level and configured to display an indication of the levelness of the electronic level based on input from the one or more sensing elements; and
a controller coupled with the one or more sensing elements and the plurality of output display elements, the controller configured to:
activate the one or more sensing elements to detect the levelness; and
activate one or more of the plurality of output display elements to display the indication based on the levelness.

2. The electronic level of claim 1, wherein the display of the electronic level comprises a first lateral portion, a second lateral portion, and a medial portion disposed between the first lateral portion and the second lateral portion, the controller further configured to:
activate a traveling set of display elements of the plurality of output display elements, based on the levelness,
wherein the traveling set is activated at variable positions along the plurality of output display elements to be disposed entirely within the medial portion when the levelness is within a levelness threshold and disposed at least partially within one of the first lateral portion and the second lateral portion when the levelness is outside the levelness threshold.

3. The electronic level of claim 2, wherein the traveling set comprises consecutively adjacent output display elements.

4. The electronic level of claim 2, wherein the traveling set is displaced from a prior position of the variable positions by a single output display element.

5. The electronic level of claim 2, wherein at least one of the variable positions is disposed within both the medial portion and one of the first lateral portion or the second lateral portion.

6. The electronic level of claim 1, wherein the controller is further configured to:
select an indicator traveling mode from a set of indicator traveling modes based on an orientation value of the electronic level.

7. The electronic level of claim 1, wherein the controller is further configured to:
select an orientation mode from a set of orientation modes based on whether an orientation value of the electronic level satisfies an orientation threshold, wherein the set of orientation modes comprises a vertical mode and a horizontal mode.

8. The electronic level of claim 1, wherein the controller is further configured to:
activate a first output display element of the plurality and a second output display element of the plurality based on the levelness satisfying a threshold, wherein the first output display element and the second output display element are configured to indicate that the levelness of the electronic level is level.

9. The electronic level of claim 1, wherein the controller is further configured to:
activate a first output display element of the plurality and a second output display element of the plurality based on whether the electronic level is on, wherein the first output display element and the second output display element are configured to indicate guides that support perception of a center of the array.

10. The electronic level of claim 1, wherein the controller is further configured to:
increment the indication across the display based on a change of the levelness from a first levelness value to a second levelness value, wherein the change of the levelness satisfies a sensitivity threshold.

11. The electronic level of claim 10, wherein the controller is further configured to:
select a sensitivity mode from a set of sensitivity modes based on user input, wherein the sensitivity threshold is based on the selected sensitivity mode.

12. The electronic level of claim 10, wherein the controller configured to increment the indication is further configured to:
increment the indication based on a sensitivity mapping, the sensitivity mapping defining respective sensitivity thresholds for each output display element of the plurality.

13. The electronic level of claim 1, wherein a difference between a first levelness threshold associated with a first output display element and a second levelness threshold associated with a second output display element adjacent to the first output display element is greater than a difference between a third levelness threshold associated with a third output display element and a fourth levelness threshold associated with a fourth output display element adjacent to the third output display element.

14. The electronic level of claim 13, wherein the second output display element is adjacent to the third output display element.

15. The electronic level of claim 1, wherein the display comprises a first presentation surface positioned on an anterior side of the electronic level and a second presentation surface positioned on a posterior side of the electronic level, wherein:
the plurality of output display elements is shared by the first presentation surface and the second presentation surface; and
the plurality of output display elements are configured to simultaneously display the indication on both the first presentation surface and the second presentation surface.

16. The electronic level of claim 1, further comprising a light sensor configured to detect light, wherein the controller is further configured to change a brightness level of the output display elements based on the light.

17. The electronic level of claim 1, further comprising a leveled indicator to indicate when the electronic level is level.

18. A display for an electronic level comprising:
a plurality of output display elements arranged in an array that extends in a direction along a longitudinal axis of the electronic level and configured to display an indication of the levelness of the electronic level based on input from one or more sensing elements of the electronic level; and
a controller coupled with the plurality of output display elements and the one or more sensing elements, the controller configured to:

activate the one or more sensing elements to detect the levelness; and activate one or more of the plurality of output display elements to display the indication based on the levelness.

19. The display of claim 18, further comprising a first lateral portion, a second lateral portion, and a medial portion disposed between the first lateral portion and the second lateral portion, the controller further configured to:

activate a traveling set of display elements of the plurality of output display elements, based on the levelness, wherein the traveling set is activated at variable positions along the plurality of output display elements to be disposed entirely within the medial portion when the levelness is within a levelness threshold and disposed at least partially within one of the first lateral portion and the second lateral portion when the levelness is outside the levelness threshold.

20. The display of claim 18, wherein the controller is further configured to: select an indicator traveling mode from a set of indicators traveling modes based on an orientation value of the electronic level.

* * * * *